US 9,057,437 B2
(12) United States Patent
Kaneko

(10) Patent No.: US 9,057,437 B2
(45) Date of Patent: Jun. 16, 2015

(54) FORKLIFT AND INCHING CONTROL METHOD OF FORKLIFT

(75) Inventor: Shinji Kaneko, Oyama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/699,548

(22) PCT Filed: Apr. 26, 2012

(86) PCT No.: PCT/JP2012/061244
§ 371 (c)(1),
(2), (4) Date: Nov. 21, 2012

(87) PCT Pub. No.: WO2013/161040
PCT Pub. Date: Oct. 31, 2013

(65) Prior Publication Data
US 2015/0033718 A1 Feb. 5, 2015

(51) Int. Cl.
F16H 61/431 (2010.01)
B66F 9/20 (2006.01)
(Continued)

(52) U.S. Cl.
CPC ............ *F16H 61/431* (2013.01); *B66F 9/20* (2013.01); *F16H 2312/10* (2013.01); *B60Y 2200/62* (2013.01); *B66F 9/22* (2013.01); *F16H 61/4157* (2013.01); *F16H 61/47* (2013.01); *F16H 61/472* (2013.01); *F16H 2059/366* (2013.01)

(58) Field of Classification Search
CPC ............ B66F 9/20; B66F 9/22; B60W 10/06; B60W 10/103; B60W 2510/1085; B60Y 2200/62; F16H 61/421; F16H 61/431; F16H 61/472; F16H 61/47; F16H 61/465; F16H 61/468; F16H 61/4157; F16H 2059/366; F16H 2059/6861; F16H 2321/10
See application file for complete search history.

(56) References Cited

U.S. PATENT DOCUMENTS 5,390,759 A  2/1995 Gollner
7,716,926 B2  5/2010 Kim
(Continued)

FOREIGN PATENT DOCUMENTS

CN  1982730 A  6/2007
CN  101156007 A  4/2008
(Continued)

OTHER PUBLICATIONS

Written Opinion of the International Searching Authority issued for PCT/JP2012/061244.
(Continued)

*Primary Examiner* — Dwayne J White
*Assistant Examiner* — Logan Kraft
(74) *Attorney, Agent, or Firm* — Locke Lord LLP

(57) ABSTRACT

In order to provide a forklift capable of performing an inching control suitable for a specific work and a running operation of the forklift and an inching control method of the forklift, an inching ratio calculating unit calculates an inching ratio, a target engine speed calculating unit calculates a target engine speed, a modulation control unit sets a time constant of the inching ratio in response to a speed difference between the target engine speed and an actual engine speed and outputs a correction inching ratio having the time constant set thereto, a multiplication unit outputs a correction absorption torque obtained by multiplying the correction inching ratio by a target absorption torque, and a HST pump electromagnetic proportional control output current converting unit outputs a current instruction value to a pump capacity setting unit.

6 Claims, 10 Drawing Sheets

(51) Int. Cl.
    *B66F 9/22*           (2006.01)
    *F16H 61/4157*     (2010.01)
    *F16H 61/47*       (2010.01)
    *F16H 61/472*      (2010.01)
    *F16H 59/36*       (2006.01)

(56) References Cited

U.S. PATENT DOCUMENTS

| | | | |
|---|---|---|---|
| 8,327,638 B2 * | 12/2012 | Ohtsukasa | 60/445 |
| 2009/0320462 A1 | 12/2009 | Ohtsukasa | |
| 2012/0152640 A1 | 6/2012 | Mori et al. | |

FOREIGN PATENT DOCUMENTS

| | | |
|---|---|---|
| DE | 4226453 A1 | 2/1994 |
| JP | 2000-213645 A | 8/2000 |
| JP | 2002-347637 A | 12/2002 |
| JP | 2008-180274 A | 8/2008 |
| JP | 2011-052792 A | 3/2011 |
| WO | WO-2012/033193 A1 | 3/2012 |

OTHER PUBLICATIONS

Office Action mailed May 9, 2014, issued for the German patent application No. 11 2012 000 056.0 and English translation thereof.

* cited by examiner

FORKLIFT AND INCHING CONTROL METHOD OF FORKLIFT

FIELD

The present invention relates to a forklift that includes a variable capacity type hydraulic pump which is driven by an engine and a hydraulic motor which forms a closed circuit between the hydraulic pump and the hydraulic motor and is driven by pressure oil discharged from the hydraulic pump, and particularly, to a forklift that performs an inching control on a hydraulic pump and an inching control method of the forklift.

BACKGROUND

A vehicle which is used as a construction machine is equipped with an engine which is a driving source and a hydraulic driving device called an HST (Hydro-Static Transmission) installed between an engine serving as a driving source and a driving wheel. A main hydraulic circuit of a closed circuit of the hydraulic driving device is configured with a variable displacement running hydraulic pump which is driven by the engine and a variable displacement hydraulic motor which is driven by pressure oil discharged from the running hydraulic pump, and the hydraulic driving device causes the vehicle to run by transmitting the driving of the hydraulic motor to the driving wheel.

A working vehicle that adopts the hydraulic driving device also includes a working hydraulic pump which is driven by the engine and drives the working machine through a working actuator. Such a working vehicle performs an inching control for increasing the absorption torque of the running hydraulic pump. For example, in Patent Document 1, an absorption torque of a running hydraulic pump is controlled by changing an inching ratio specified by an inching operation amount.

Further, Patent Document 2 discloses a working vehicle which generates a large brake force by an inching operation. In particular, an inching control is performed so that a minimum capacity of a hydraulic motor is set to a large value as a pilot pressure detected by a pilot pressure detecting unit decreases when performing an inching operation.

CITATION LIST

Patent Literature

Patent Document 1: Japanese Laid-open Patent Publication No. 2008-180274
Patent Document 2: Japanese Laid-open Patent Publication No. 2011-52792

SUMMARY

Technical Problem

Incidentally, even a forklift as one of the above-described working vehicles may include a hydraulic driving device having the HST circuit and perform an inching control. The inching control of the forklift is a brake unit that stops a vehicle body, and is performed by operating an inching pedal having a mechanical brake function in the forklift. An inching ratio first decreases when stepping the inching pedal, and a mechanical brake ratio increases when further stepping the inching pedal. In the specific work of the forklift that performs the inching control, for example, an engine speed is increased by stepping an accelerator pedal while stepping the inching pedal (in a vehicle stop state), and a cargo handling operation is performed by moving the working machine. Subsequently, a forward and backward lever is switched to a backward moving mode, and a foot is simultaneously separated from the inching pedal and the accelerator pedal, so that the vehicle moves backward. Further, the engine speed is increased by stepping the accelerator pedal while stepping the inching pedal (in a vehicle stop state), and the foot is abruptly separated from the inching pedal, so that a cargo is pushed by a fork or the fork is drawn from the gap of the cargo.

Here, in the above-described forklift, the responsiveness of the engine speed with respect to the accelerator operation is different from the responsiveness of the hydraulic pump with respect to the inching operation. In general, since the responsiveness of the engine speed with respect to the accelerator operation is slower than the responsiveness of the hydraulic pump by the inching operation, when the inching control is performed while maintaining the high rotation state of the engine speed, a high absorption torque is generated in the hydraulic pump, and a large acceleration is applied to the forklift to lead an operator may sense the jumping of the forklift.

Therefore, it is supposed that the responsiveness of the hydraulic pump by the inching operation is subjected to the modulation so that the responsiveness is delayed and matches the responsiveness of the engine speed with respect to the accelerator operation. However, since the responsiveness of the hydraulic pump is degraded, there is a case in which a sufficient acceleration may not be obtained when performing the specific pushing or drawing operation of the forklift.

The invention is made in view of the above-described circumstances, and it is an object of the invention to provide a forklift capable of performing an inching control suitable for a specific work and a running operation of the forklift and an inching control method of the forklift.

Solution to Problem

According to a first aspect of the present invention in order to solve the above problems, there is provided a forklift including: a variable displacement hydraulic pump which is driven by an engine; a hydraulic motor for forming a closed circuit between the hydraulic pump and the hydraulic motor, the hydraulic motor being driven by pressure oil discharged from the hydraulic pump; driving wheels which are driven by the hydraulic motor; a working machine which is hydraulically driven by a variable displacement working machine hydraulic pump driven by the engine; an accelerator operating unit for increasing or decreasing a fuel injection amount to the engine; an inching operating unit for operating an inching ratio as a decrease ratio of a target absorption torque of the hydraulic pump by the stepping of an inching pedal; an actual engine speed detecting unit for detecting an actual engine speed of the engine; a target engine speed calculating unit for calculating a target engine speed corresponding to the operation amount of the accelerator operating unit; an inching ratio calculating unit for calculating the inching ratio corresponding to the operation amount of the inching operating unit; a modulation control unit for setting an output time constant of the inching ratio in response to a speed difference between the target engine speed and the actual engine speed so as to perform a modulation control outputting a correction inching ratio having the output time constant set thereto; and an output control unit for outputting an instruction of an absorption torque which decrease the target absorption torque at the correction inching ratio output from the modulation control unit to the hydraulic pump.

According to another aspect of the present invention, there is provided the forklift according to the above aspect, wherein the modulation control unit increases the output time constant of the inching ratio as the value of the speed difference obtained by subtracting the actual engine speed from the target engine speed increases.

According to still another aspect of the present invention, there is provided the forklift according to the above aspects, wherein the modulation control unit performs the modulation control when the inching ratio decreases.

According to still another aspect of the present invention, there is provided an inching control method of a forklift including: a variable displacement hydraulic pump which is driven by an engine; a hydraulic motor for forming a closed circuit between the hydraulic pump and the hydraulic motor, the hydraulic motor being driven by pressure oil discharged from the hydraulic pump; driving wheels which are driven by the hydraulic motor, a working machine which is hydraulically driven by a variable displacement working machine hydraulic pump driven by the engine; an accelerator operating unit for increasing or decreasing a fuel injection amount to the engine; and an inching operating unit for operating an inching ratio as a decrease ratio of a target absorption torque of the hydraulic pump by the stepping of an inching pedal, the inching control method including: an inching ratio calculating of calculating the inching ratio corresponding to the operation amount of the inching operating unit; and a modulation controlling of setting an output time constant of the inching ratio in response to a speed difference between a target engine speed corresponding to the operation amount of the accelerator operating unit and an actual engine speed of the engine so as to perform a modulation control outputting a correction inching ratio having the output time constant set thereto.

According to still another aspect of the present invention, there is provided the inching control method of the forklift according to the above aspect, wherein the modulation controlling increases the output time constant of the inching ratio as the value of the speed difference obtained by subtracting the actual engine speed from the target engine speed increases.

According to still another aspect if the present invention, there is provided the inching control method of the forklift according to the above aspects, wherein the modulation controlling performs the modulation control when the inching ratio decreases.

Advantageous Effects of Invention

According to the invention, the target engine speed calculating unit calculates the target engine speed corresponding to the operation amount of the accelerator operating unit, the inching ratio calculating unit calculates the inching ratio corresponding to the operation amount of the inching operating unit, the modulation control unit sets the output time constant of the inching ratio in response to the speed difference between the target engine speed and the actual engine speed and outputs the correction inching ratio having the output time constant set thereto, and the output control unit outputs the instruction of the absorption torque decreasing the target absorption torque at the correction inching ratio output from the modulation control unit to the hydraulic pump. Accordingly, it is possible to perform the inching control suitable for the specific work and the running operation of the forklift.

DESCRIPTION OF EMBODIMENTS

Hereinafter, an embodiment of the invention will be described by referring to the accompanying drawings.

Figure 1:
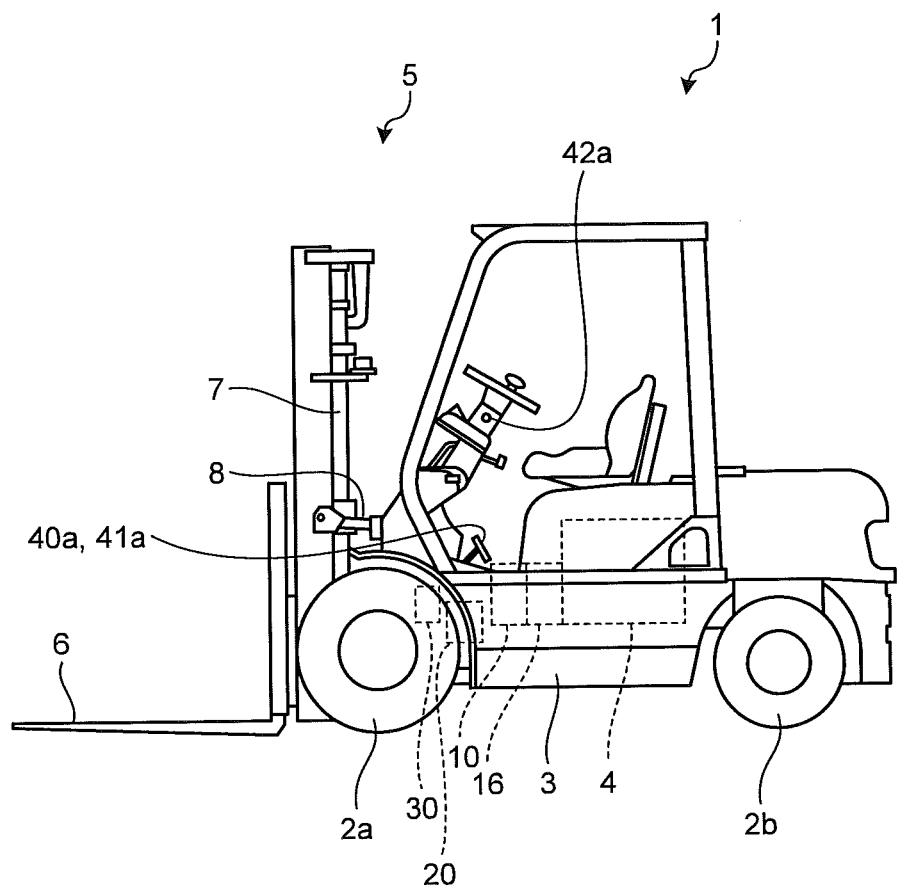
FIG. 1 is a diagram illustrating an entire configuration of a forklift which is an embodiment of the invention.
Figure 2:
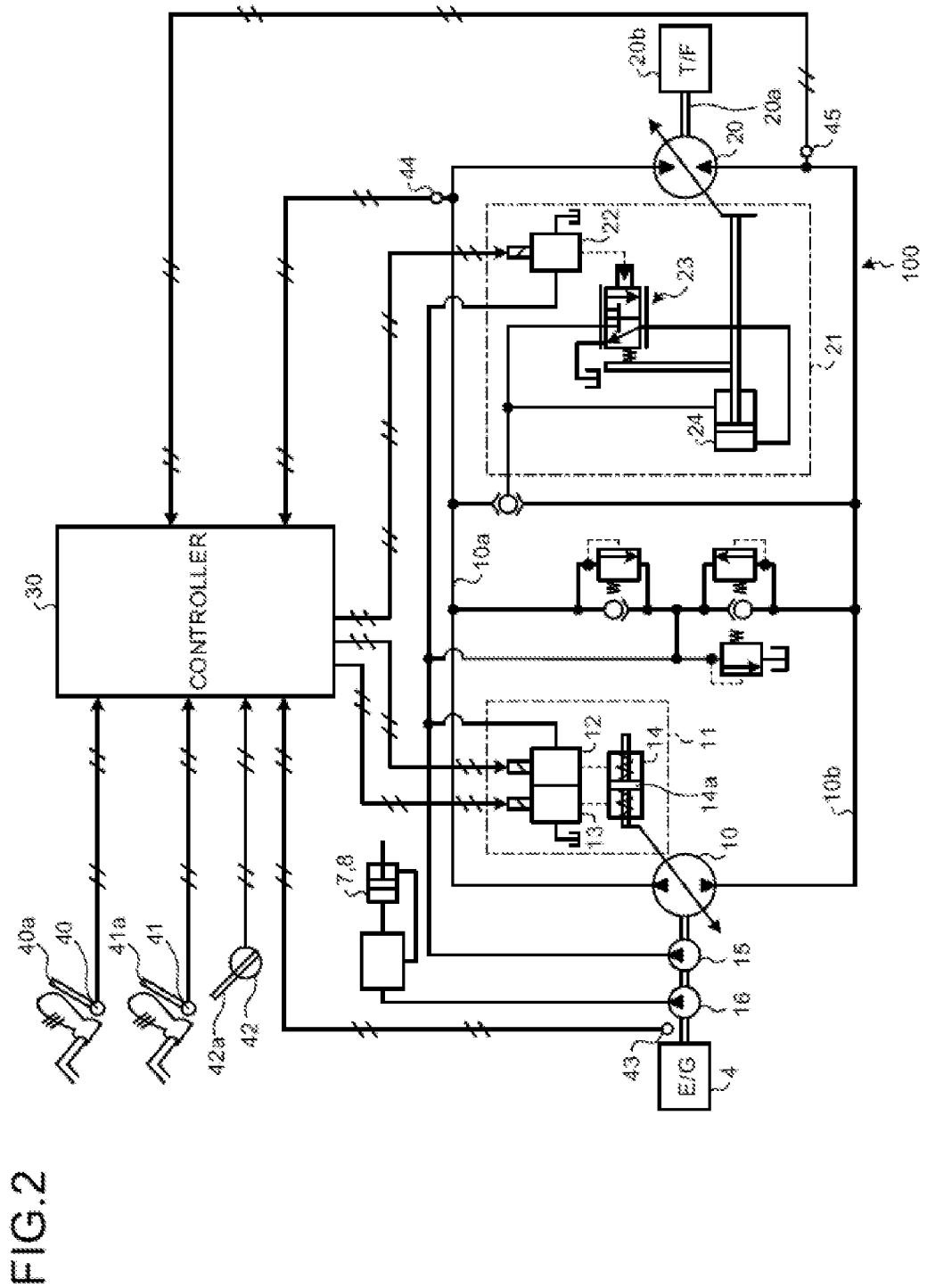
FIG. 2 is a block diagram illustrating a circuit configuration of the forklift illustrated in FIG. 1.

FIG. 1 is a diagram illustrating an entire configuration of a forklift which is an embodiment of the invention. Further, FIG. 2 is a block diagram illustrating a circuit configuration of the forklift illustrated in FIG. 1. In FIG. 1, a forklift 1 has a configuration in which a working machine 5 is provided in a vehicle body 3 equipped with driving wheels 2a and steering wheels 2b. The vehicle body 3 includes an engine 4 and a variable capacity type hydraulic pump 10 and a working machine hydraulic pump 16 which are driven by using the engine 4 as a driving source. The driving wheels 2a is driven to run by an HST (Hydrostatic Transmission: Hydrostatic Power Transmission Device) which runs by the power of the hydraulic motor 20 by connecting the variable displacement hydraulic pump 10 and the variable displacement hydraulic motor 20 to each other in a closed hydraulic circuit.

The working machine 5 includes a lifting cylinder 7 which drives a fork 6 so as to be moved upward and downward and a tilting cylinder 8 which drives the fork 6 so as to be tilted. A driver seat of the vehicle body 3 is equipped with a forward and backward lever 42a, an inching pedal 40a, an accelerator pedal 41a, and a working machine operating lever (not illustrated) with a lifting lever or a tilting lever used to operate the working machine 5. Furthermore, the inching pedal 40a and the accelerator pedal 41a are arranged at a position where a stepping operation may be performed from the driver seat. Furthermore, in FIG. 1, the inching pedal 40a and the accelerator pedal 41a are depicted so as to overlap each other.

As illustrated in FIG. 2, a hydraulic pump 10 and a hydraulic motor 20 are provided through the connection by hydraulic pressure supply pipes 10a and 10b of a main hydraulic circuit 100 which becomes a closed circuit. The hydraulic pump 10 (hereinafter, referred to as the "HST pump 10") is driven by the engine 4, and is configured as, for example, a variable displacement type in which a capacity is changed by changing a swash plate tilting angle.

The hydraulic motor 20 (hereinafter, referred to as the "HST motor 20") is driven by pressure oil discharged from the HST pump 10, and is configured as, for example, a variable displacement type in which a capacity is changed by changing a clinoaxis tilting angle. Furthermore, the HST motor 20 may be a fixed capacity type. The HST motor 20 has a configuration in which an output shaft 20a is connected to the driving wheels 2a through a transfer 20b and may cause the forklift 1 to run by rotationally driving the driving wheels 2a. The HST motor 20 may change a rotation direction in response to a direction in which pressure oil is supplied from the HST pump 10, and may cause the vehicle to move forward or backward. Furthermore, in the description below, for convenience of description, a description will be made on the assumption that the forklift 1 moves forward when the pressure oil is supplied from the hydraulic pressure supply pipe 10a to the HST motor 20 and the forklift 1 moves backward when the pressure oil is supplied from the hydraulic pressure supply pipe 10b to the HST motor 20.

The forklift 1 is equipped with a pump capacity setting unit 11, a motor capacity setting unit 21, and a charge pump 15.

The pump capacity setting unit 11 is attached to the HST pump 10, and includes a forward moving pump electromagnetic proportional control valve 12, a backward moving pump electromagnetic proportional control valve 13, and a pump capacity control cylinder 14. In the pump capacity setting unit 11, when an instruction signal is given from a controller 30 to be described later to the forward moving pump electromagnetic proportional control valve 12 and the backward moving pump electromagnetic proportional control valve 13, the pump capacity control cylinder 14 is operated in response to the instruction signal, and the swash plate tilting angle of the HST pump 10 is changed so that the setting of the capacity is changed.

In the pump capacity control cylinder 14, a piston 14a is maintained at a neutral position in a non-load state. In this state, the swash plate tilting angle of the HST pump 10 also becomes zero, and even when the engine 4 rotates, the amount of the pressure oil discharged to the main hydraulic circuit 100 is zero.

When an instruction signal for increasing the capacity of the HST pump 10 is given from the controller 30 to, for example, the forward moving pump electromagnetic proportional control valve 12 in this state, a pump control pressure is given from the forward moving pump electromagnetic proportional control valve 12 to the pump capacity control cylinder 14 in response to the instruction signal, so that the piston 14a moves to the left side in FIG. 2. When the piston 14a of the pump capacity control cylinder 14 moves to the left side in FIG. 2, the swash plate of the HST pump 10 is tilted with respect to the hydraulic pressure supply pipe 10a in a direction in which the pressure oil is discharged in accordance with the movement. The change amount of the swash plate tilting angle of the HST pump 10 also increases since the movement amount of the piston 14a increases with an increase in the pump control pressure supplied from the forward moving pump electromagnetic proportional control valve 12. That is, when an instruction signal is given from the controller 30 to the forward moving pump electromagnetic proportional control valve 12, the pump control pressure obtained in response to the instruction signal is given from the forward moving pump electromagnetic proportional control valve 12 to the pump capacity control cylinder 14, so that the swash plate of the HST pump 10 is tilted by the operation of the pump capacity control cylinder 14 such that a desired amount of pressure oil is discharged to the hydraulic pressure supply pipe 10a. As a result, when the engine 4 is rotated, the pressure oil is discharged from the HST pump 10 to the hydraulic pressure supply pipe 10a, so that the HST motor 20 may be rotated in the forward moving direction.

When an instruction signal for decreasing the capacity of the HST pump 10 is given from the controller 30 to the forward moving pump electromagnetic proportional control valve 12 in the above-described state, the pump control pressure supplied from the forward moving pump electromagnetic proportional control valve 12 to the pump capacity control cylinder 14 decreases in response to the instruction signal, so that the piston 14a moves toward the neutral position. As a result, the swash plate tilting angle of the HST pump 10 decreases, and the amount of the pressure oil which is discharged from the HST pump 10 to the hydraulic pressure supply pipe 10a decreases.

On the other hand, when an instruction signal for increasing the capacity of the HST pump 10 is given from the controller 30 to the backward moving pump electromagnetic proportional control valve 13, the pump control pressure is given from the backward moving pump electromagnetic proportional control valve 13 to the pump capacity control cylinder 14 in response to the instruction signal, so that the piston 14a moves to the right side in FIG. 2. When the piston 14a of the pump capacity control cylinder 14 moves to the right side in FIG. 2, the swash plate of the HST pump 10 is tilted with respect to the hydraulic pressure supply pipe 10b in a direction in which the pressure oil is discharged in accordance with the movement. The change amount of the swash plate tilting angle of the HST pump 10 increases since the movement of the piston 14a increases with an increase in the pump control pressure supplied from the backward moving pump electromagnetic proportional control valve 13. That is, when an instruction signal is given from the controller 30 to the backward moving pump electromagnetic proportional control valve 13, the pump control pressure obtained in response to the instruction signal is given from the backward moving pump electromagnetic proportional control valve 13 to the pump capacity control cylinder 14, so that the swash plate of the HST pump 10 is tilted by the operation of the pump capacity control cylinder 14 such that a desired amount of pressure oil is discharged to the hydraulic pressure supply pipe 10b. As a result, when the engine 4 is rotated, the pressure oil is discharged from the HST pump 10 to the hydraulic pressure supply pipe 10b, so that the HST motor 20 may be rotated in the backward moving direction.

When an instruction signal for decreasing the capacity of the HST pump 10 is given from the controller 30 to the backward moving pump electromagnetic proportional control valve 13 in the above-described state, the pump control pressure supplied from the backward moving pump electromagnetic proportional control valve 13 to the pump capacity control cylinder 14 in response to the instruction signal decreases, so that the piston 14a moves toward the neutral position. As a result, the swash plate tilting angle of the HST pump 10 decreases, and the amount of the pressure oil discharged from the HST pump 10 to the hydraulic pressure supply pipe 10b decreases.

The motor capacity setting unit 21 is attached to the HST motor 20, and includes a motor electromagnetic proportional control valve 22, a motor cylinder control valve 23, and a motor capacity control cylinder 24. In the motor capacity setting unit 21, when an instruction signal is given from the controller 30 to the motor electromagnetic proportional control valve 22, a motor control pressure is supplied from the motor electromagnetic proportional control valve 22 to the motor cylinder control valve 23, so that the motor capacity control cylinder 24 is operated. When the motor capacity control cylinder 24 is operated, the clinoaxis tilting angle of the HST motor 20 changes in accordance with the operation, and the setting of the capacity of the HST motor 20 is changed in response to the instruction signal. Specifically, the motor capacity setting unit 21 is configured so that the clinoaxis tilting angle of the HST motor 20 decreases as the motor control pressure supplied from the motor electromagnetic proportional control valve 22 increases.

The charge pump 15 is driven by the engine 4, and has a function of supplying a pump control pressure to the pump capacity control cylinder 14 through the forward moving pump electromagnetic proportional control valve 12 and the backward moving pump electromagnetic proportional control valve 13 and supplying a motor control pressure to the motor cylinder control valve 23 through the motor electromagnetic proportional control valve 22.

Furthermore, the working machine hydraulic pump 16 in FIG. 2 is driven by the engine 4. The working machine hydraulic pump 16 supplies pressure oil to the lifting cylinder 7 and the tilting cylinder 8 as actuators for driving the working machine 5.

Further, the forklift 1 is equipped with an inching potentiometer 40, an accelerator potentiometer 41, a forward and backward lever switch 42, an engine rotation sensor 43, and two pressure detecting sensors 44 and 45.

Figure 3:
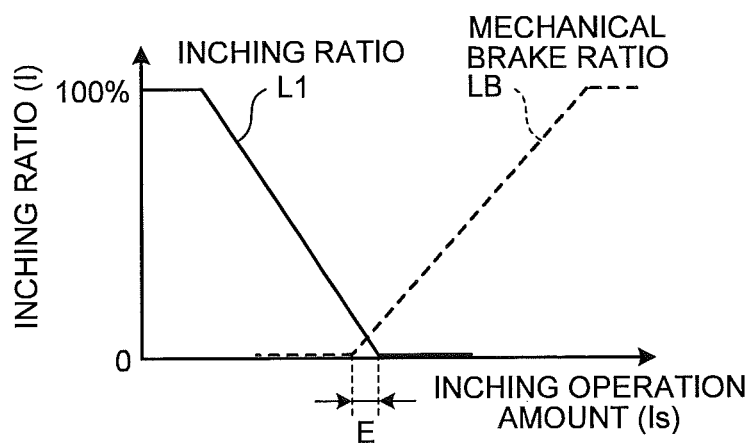
FIG. 3 is a diagram illustrating a change in inching ratio with respect to an inching operation amount.
Figure 4:
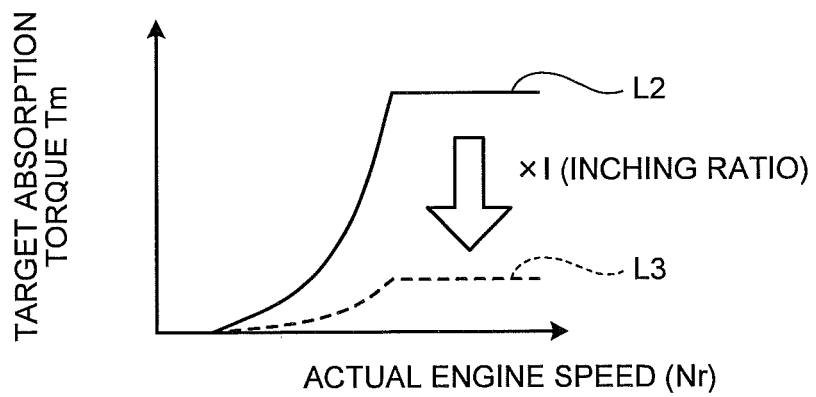
FIG. 4 is a diagram illustrating a target absorption torque with respect to an actual engine speed and a target absorption torque decreasing state by an inching ratio.

The inching potentiometer 40 is configured to output an inching operation amount Is when the inching pedal 40a is operated. The inching operation amount Is which is output from the inching potentiometer 40 is input to the controller 30. Here, as illustrated in FIG. 3, the inching potentiometer 40 changes the inching ratio I from 100 to 0% as illustrated in a characteristic curve L1 when the inching operation amount Is as the stepping amount of the inching pedal 40a is from 0 to 50%, and further changes a mechanical brake ratio representing an effective condition of a mechanical brake (not illustrated) from 0 to 100% as illustrated in a characteristic curve LB when the inching operation amount Is is less than 50 or equal to 100%. Furthermore, there is an overlapping region E where the inching ratio I and the mechanical brake ratio become 0% or more when the inching operation amount Is is around 50%. The overlapping region E is determined in consideration of the operation sensation of the inching pedal 40a. On the other hand, FIG. 4 illustrates a characteristic curve L2 of a target absorption torque Tm of the HST pump 10 with respect to an actual engine speed Nr, where the characteristic curve L2 changes to, for example, a characteristic curve L3 by multiplying the inching ratio I by the characteristic curve L2. That is, the target absorption torque Tm of the HST pump 10 decreases with an increase in the inching ratio I.

The accelerator potentiometer 41 is configured to output an accelerator operation amount (an opening degree) As when the accelerator pedal 41a is operated. The accelerator operation amount (the opening degree) As which is output from the accelerator potentiometer 41 is input to the controller 30.

The forward and backward lever switch 42 is a selection switch which is used to input the vehicle moving direction. In the embodiment, the forward and backward lever switch 42 is adopted which may select three moving directions, that is, "forward", "neutral", and "backward" by the operation of the forward and backward lever 42a provided at a position where the selection operation may be performed from a driver's seat. The information which represents the moving direction selected by the forward and backward lever switch 42 may be given as selection information to the controller 30.

The engine rotation sensor 43 is configured to detect the speed of the engine 4. The information which represents the actual engine speed Nr indicating the speed of the engine 4 detected by the engine rotation sensor 43 is input to the controller 30.

The controller 30 generates the instruction signals of the forward moving pump electromagnetic proportional control valve 12 and the backward moving pump electromagnetic proportional control valve 13 based on the input signals from the inching potentiometer 40, the accelerator potentiometer 41, the forward and backward lever switch 42, the engine rotation sensor 43, and the pressure detecting sensors 44 and 45, and gives the generated instruction signals to the respective electromagnetic proportional control valves 12, 13, and 22.

Figure 5:
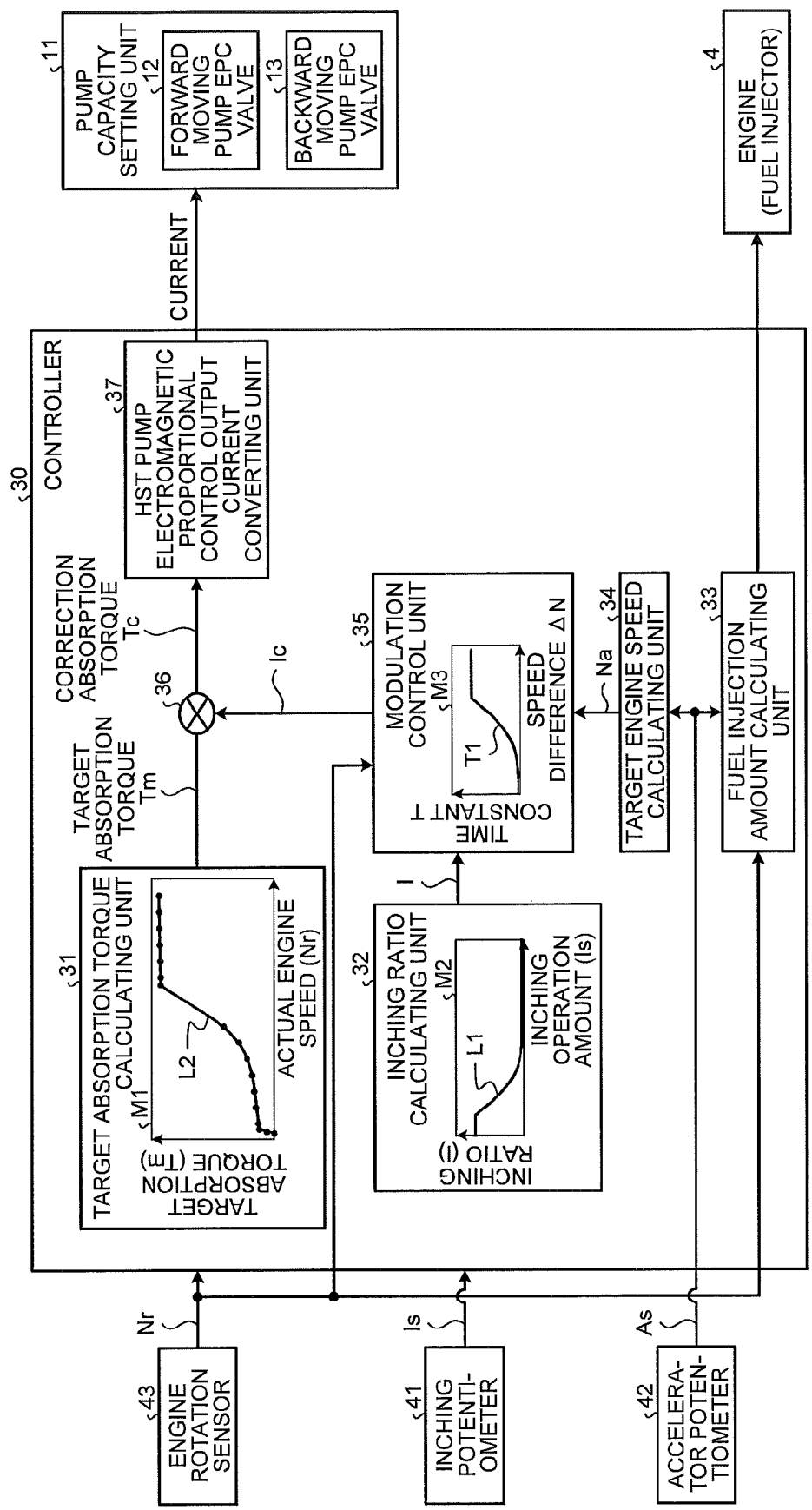
FIG. 5 is a block diagram illustrating a configuration of a controller which performs a modulation control process.

FIG. 5 is a block diagram illustrating a pump control including an inching control with respect to the HST pump 10 by the controller 30. As illustrated in FIG. 5, the controller 30 includes a target absorption torque calculating unit 31, an inching ratio calculating unit 32, a fuel injection amount calculating unit 33, a target engine speed calculating unit 34, a modulation control unit 35, a multiplication unit 36, and an HST pump electromagnetic proportional control output current converting unit 37.

The target absorption torque calculating unit 31 is configured to calculate and output the target absorption torque Tm of the HST pump 10 based on the actual engine speed Nr detected by the engine rotation sensor 43. The target absorption torque calculating unit 31 includes a map M1 which represents the characteristic of the target absorption torque Tm with respect to the actual engine speed Nr, calculates the target absorption torque Tm corresponding to the input actual engine speed Nr based on the characteristic curve L2 on the map M1, and outputs the target absorption torque Tm to the multiplication unit 36.

The inching ratio calculating unit 32 is configured to calculate and output the inching ratio I based on the inching operation amount Is detected by the inching potentiometer 40. The inching ratio calculating unit 32 includes a map M2 which represents the characteristic of the inching ratio I with respect to the inching operation amount Is, calculates the inching ratio I corresponding to the input inching operation amount Is based on the characteristic curve L1 on the map M2, and outputs the inching ratio I to the modulation control unit 35.

The target engine speed calculating unit 34 estimates and calculates the target engine speed Na based on the accelerator operation amount As detected by the accelerator potentiometer 41 and outputs the calculated target engine speed Na to the modulation control unit 35.

The modulation control unit 35 sets a time constant T of the inching ratio I in response to a speed difference $\Delta N$ between the target engine speed Na and the actual engine speed Nr, and outputs the correction inching ratio Ic at a delayed timing in response to the time constant T to the multiplication unit 36. The modulation control unit 35 first subtracts the actual engine speed Nr from the target engine speed Na so as to calculate the speed difference $\Delta N$. Here, the modulation control unit 35 includes a map M3 which represents the characteristic of the time constant T with respect to the speed difference $\Delta N$, sets the time constant T corresponding to the speed difference $\Delta N$ based on the characteristic curve T1 on the map M3, and performs a modulation control in which the correction inching ratio Ic delaying the output of the input inching ratio I by the set time constant T is output to the multiplication unit 36.

Figure 6:
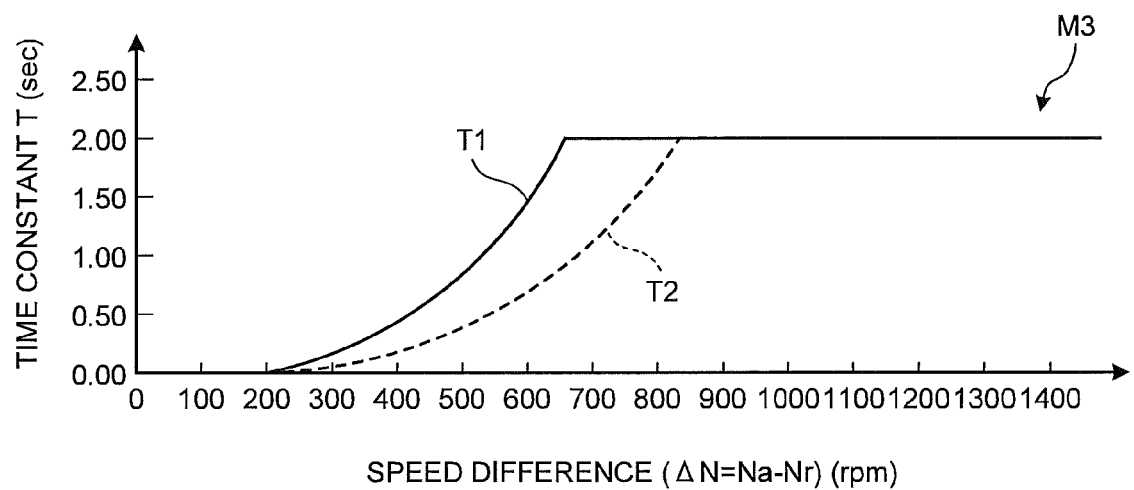
FIG. 6 is a diagram illustrating an example of a map which illustrates a correlation of a time constant with respect to a speed difference.

Furthermore, in the modulation control unit 35, the time constant T is set in the characteristic curve T1 with respect to the speed difference ΔN as in the map M3 illustrated in FIG. 6. Specifically, the time constant T sequentially becomes a large value from the time point in which the speed difference ΔN exceeds 200 rpm, the time constant T becomes 2 seconds at the time point in which the speed difference ΔN is 650 rpm, and the time constant T is maintained at 2 seconds at the time point in which the speed difference ΔN is 650 rpm or more. The characteristic curve T1 of the time constant T is an example. For example, as illustrated in the characteristic curve T2, the time constant T may increase until the speed difference ΔN becomes 800 rpm and the time constant T is maintained at 2 seconds at 800 rpm or more.

Further, the map M3 illustrates the relation of the time constant T with respect to the speed difference ΔN, but the invention is not limited thereto. The map may illustrate a relation of a cutoff frequency f with respect to the speed difference ΔN. In a case where the relation of the cutoff frequency f is used, the cutoff frequency f may be converted into the time constant T by using the equation of the time constant $T=1/(2\pi f)$. Furthermore, the time constant T is the time constant of the first delaying component.

In addition, in the map M3, the time constant T monotonously increases while changing in the range of the speed difference ΔN=200 to 650 rpm as illustrated in, for example, the characteristic curve T1. Particularly, a so-called limit type characteristic is exhibited in which the time constant is cut off when the time constant T=2 seconds around 650 rpm.

On the other hand, the multiplication unit 36 multiplies the correction inching ratio Ic by the target absorption torque Tm, and outputs the correction absorption torque Tc in which the target absorption torque Tm decreases by the corresponding correction inching ratio Ic to the HST pump electromagnetic proportional control output current converting unit 37.

The HST pump electromagnetic proportional control output current converting unit 37 generates an output current value in which the HST pump 10 becomes the input correction absorption torque Tc, and outputs the result to the forward moving pump electromagnetic proportional control valve 12 or the backward moving pump electromagnetic proportional control valve 13 of the pump capacity setting unit 11.

Further, the fuel injection amount calculating unit 33 calculates an amount of fuel to be injected to the fuel injector of the engine 4 based on the actual engine speed Nr and the accelerator operation amount As which are input, and outputs the result to the fuel injector.

Next, referring to the time charts illustrated in FIGS. 7 to 9, the action of the inching control by the controller 30 will be described.

Figure 7:
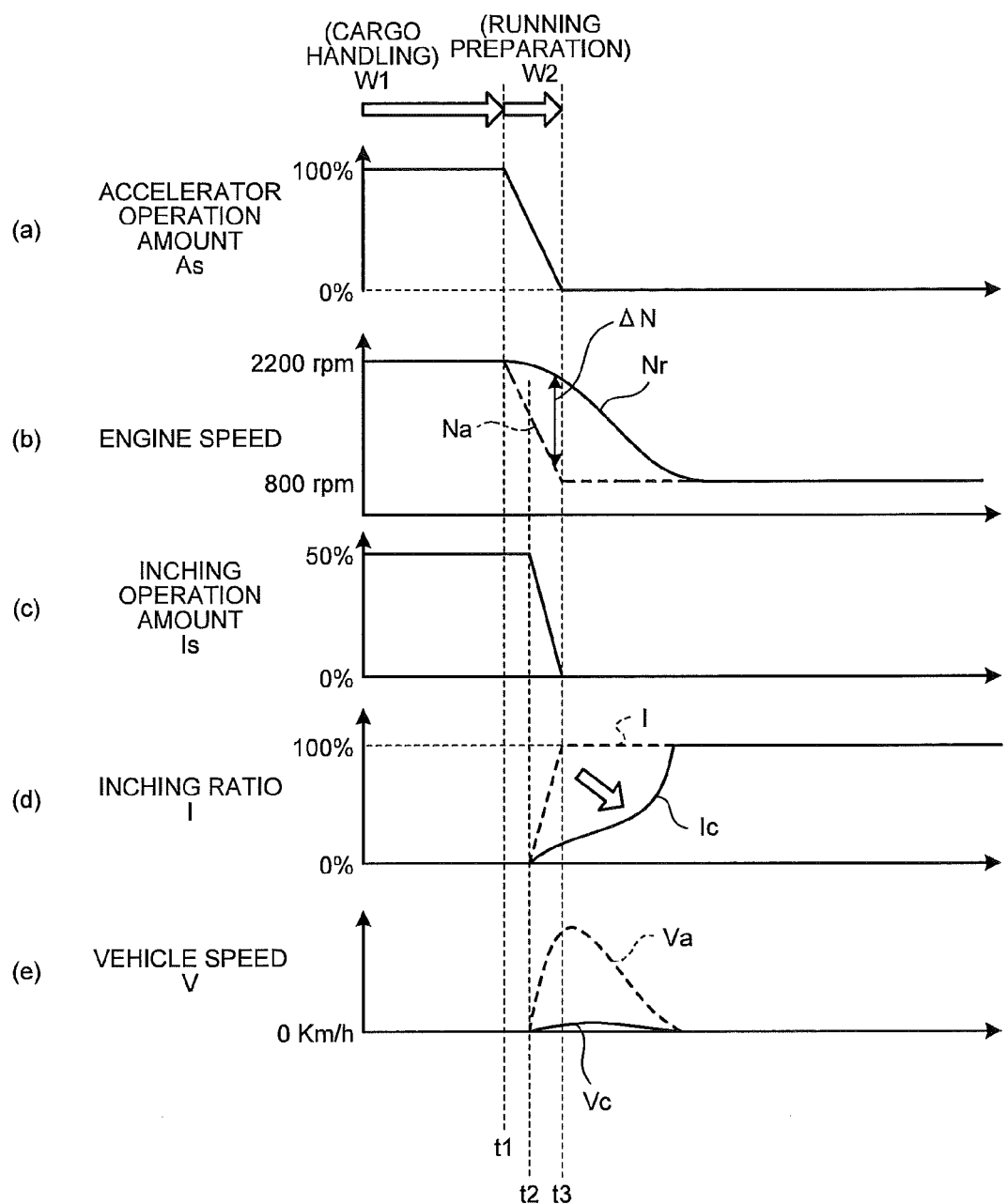
FIG. 7 is a time chart illustrating an inching control when a running preparation is performed after performing a cargo handling operation in a state where an actual engine speed increases.

FIG. 7 illustrates a case where a running preparation (W2) is performed after performing a cargo handling operation (W1) by the working machine 5 in a state where the actual engine speed Nr increases. That is, the cargo handling operation is performed up to the time point t1 in a state where the actual engine speed Nr is set to a high rotation of 2200 rpm by setting the accelerator operation amount As to 100% at maximum and the inching ratio I is set to 0% by setting the inching operation amount Is to 50% at maximum. Subsequently, when the accelerator operation amount As is set to 0% from the time point t1 to the time point t3 in order to perform the running preparation, the engine 4 rotates by inertia even at the time point t3, so that the actual engine speed Nr does not abruptly decreases. On the other hand, at this time, the inching operation amount Is is set to 0% from the time point t2 to the time point t3. This is because the operator sets the inching ratio to 100% for the running preparation since the cargo handling operation ends.

Here, the inching ratio I of the related art changes from 0% to 100% at the time point t3 with the inching operation amount Is after the time point t2. As described above, the actual engine speed Nr is in a comparatively high rotation state from the time point t2 to the time point t3. Also, since an instruction of the absorption torque which abruptly increases with an abrupt increase in the inching ratio I is instructed to the HST pump 10, a vehicle speed Va of the forklift 1 abruptly increases, so that an acceleration which causes the sensation of jumping of the forklift 1 occurs. In this case, the operator performs the running preparation W2, but has no intension to start the forklift 1.

On the contrary, in the embodiment, even when the inching operation amount Is abruptly decreases from the time point t2 to the time point t3, the modulation control unit 35 corrects the inching ratio I and outputs the inching ratio as the correction inching ratio Ic that is output at a delayed timing through the modulation process in which the time constant T increases as the speed difference ΔN between the target engine speed Na and the actual engine speed Nr increases. Accordingly, even when the actual engine speed Nr is large from the time point t2 to the time point t3, the vehicle speed Vc does not abruptly increases, so that the acceleration causing the sensation of jumping of the forklift 1 does not occur.

Figure 8:
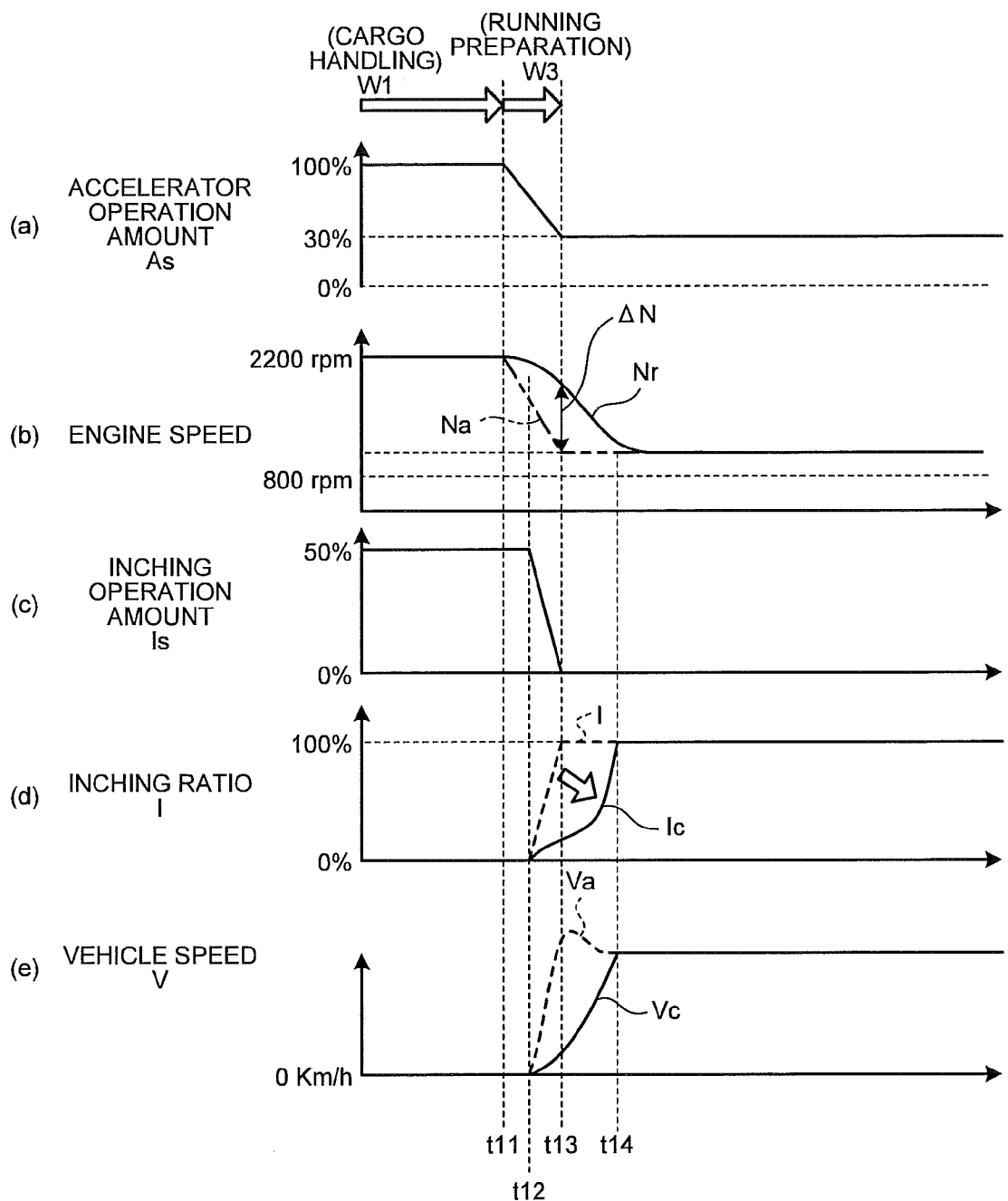
FIG. 8 is a time chart illustrating an inching control when performing a running preparation for an immediate running operation after performing a cargo handling operation in a state where an actual engine speed increases.

FIG. 8 illustrates a case where a running preparation (W3) for immediate running is performed after performing the cargo handling operation (W1) by the working machine 5 in a state where the actual engine speed Nr increases. That is, in FIG. 7, the accelerator operation amount As decreases from 100% to 0% from the time point t1 to the time point t3. However, in FIG. 8, the accelerator operation amount As decreases from 100% to 30% from the time point t11 to the time point t13, and is maintained at 30% after the time point t12. That is, the operator maintains the accelerator operation amount As at 30% instead of 0% after the cargo handling operation so as to switch to the running.

Even in the case of FIG. 8, in the inching control of the related art, the inching ratio I changes only in response to the inching operation amount Is, and an instruction of the absorption torque which abruptly increases in response to an abrupt increase in the inching ratio I is instructed to the HST pump 10. Accordingly, the vehicle speed Va of the forklift 1 abruptly increases, so that an acceleration which causes the sensation of jumping of the forklift 1 occurs.

On the contrary, in the embodiment, even when the inching operation amount Is abruptly decreases from the time point t12 to the time point t13, the modulation control unit 35 corrects the inching ratio I and outputs the inching ratio as the correction inching ratio Ic that is output at a delayed timing through the modulation process in which the time constant T increases as the speed difference ΔN between the target engine speed Na and the actual engine speed Nr increases. Accordingly, even when the actual engine speed Nr is large from the time point t12 to the time point t13, the vehicle speed Vc does not abruptly increase, so that an acceleration which causes the sensation of jumping of the forklift 1 does not occur. Further, the vehicle speed increases as the speed difference ΔN between the actual engine speed and the target engine speed Na decreases from the time point t13 to the time point t14. Accordingly, it is possible to switch to the running state according to the intension of the operator without sensing an abrupt acceleration.

Figure 9:
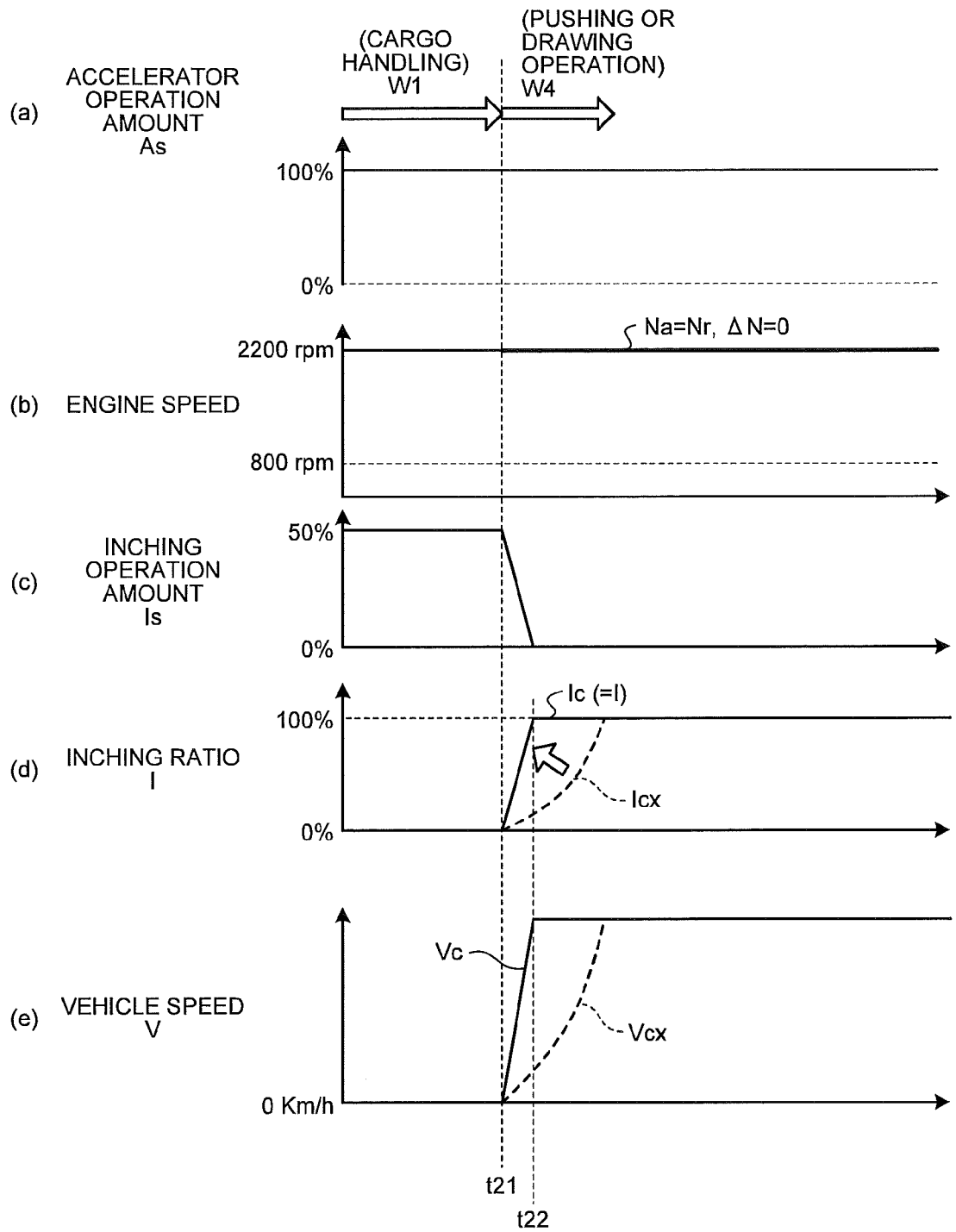
FIG. 9 is a time chart illustrating an inching control when a pushing or drawing operation is performed after performing a cargo handling operation in a state where an actual engine speed Nr increases.

FIG. 9 illustrates a case where a pushing or drawing operation (W4) of the working machine 5 (the fork 6) is performed after performing the cargo handling operation (W1) by the working machine 5 in a state where the actual engine speed Nr increases. Even in such an operation, in the embodiment, the accelerator operation amount As is set to 100%, and the actual engine speed Nr is maintained at the high rotation state (2200 rpm). Then, when an operation of abruptly increasing the inching ratio is performed by changing the inching operation amount Is from 50% from the time point t21 to the time point t22 after the cargo handling operation, the correction inching ratio Ic abruptly increases as in the inching ratio I of the related art since the actual engine speed Nr is equal to the target engine speed Na and the speed difference $\Delta$=0, and hence an instruction of the absorption torque which abruptly increases in response to an abrupt increase in the correction inching ratio Ic is instructed to the HST pump 10. Accordingly, the vehicle speed Vc of the forklift 1 abruptly increases, so that a large acceleration is given to the forklift 1, thereby performing the pushing or drawing operation of the fork 6.

On the contrary, in the related art in which the modulation control is performed by the uniform correction value, a modulation process with a large delay amount is performed as in a correction inching ratio Icx after the time point t21. As a result, a large acceleration may not be obtained as in a vehicle speed Vcx, and hence there is a case in which it is difficult to perform the pushing or drawing operation of the fork 6.

Incidentally, in the modulation process performed by the modulation control unit 35, it is supposed that the brake force of the HST pump 10 may be degraded or the hydraulic circuit of the HST may be damaged when the inching pedal 40a is stepped, that is, the inching ratio I decreases. For this reason, it is desirable to perform the modulation process by the modulation control unit 35 only when the inching ratio I increases (does not decrease).

Figure 10:
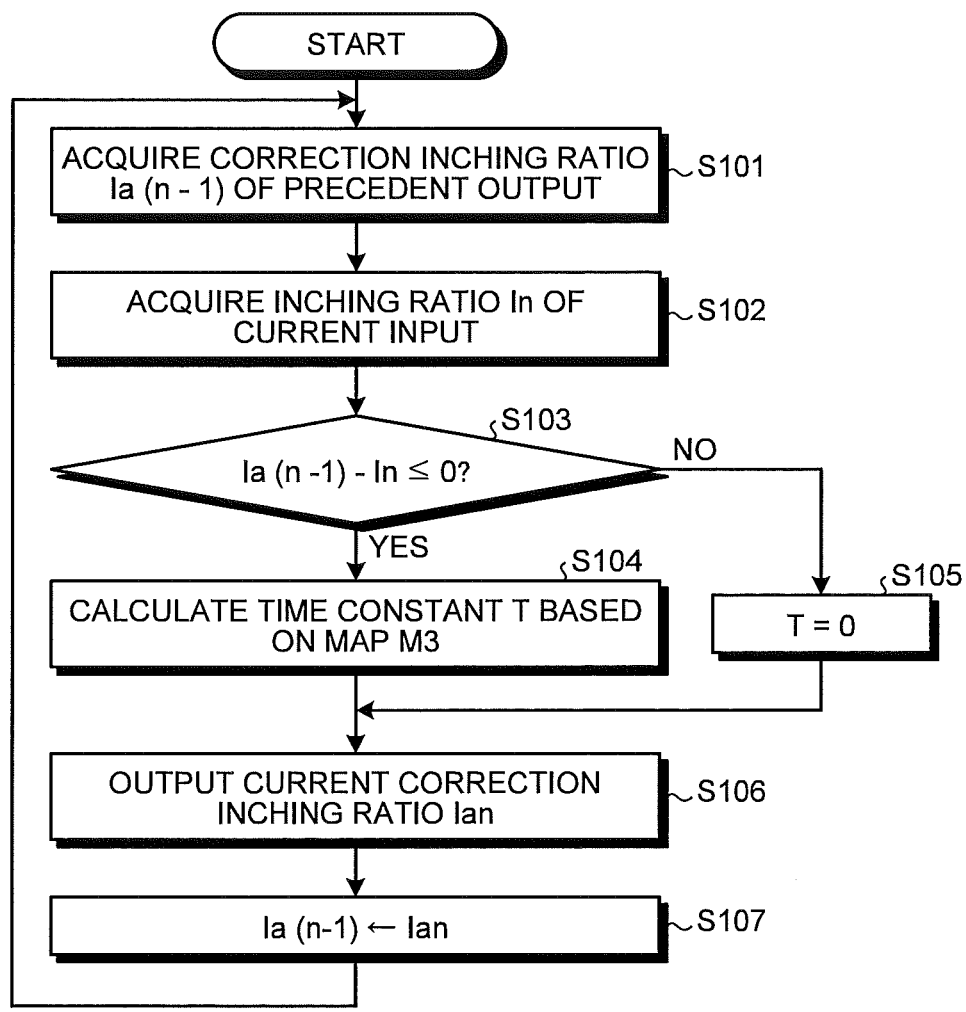
FIG. 10 is a flowchart illustrating a process procedure of a modulation control unit which performs a modulation process only when an inching ratio does not decrease.
Figure 11:
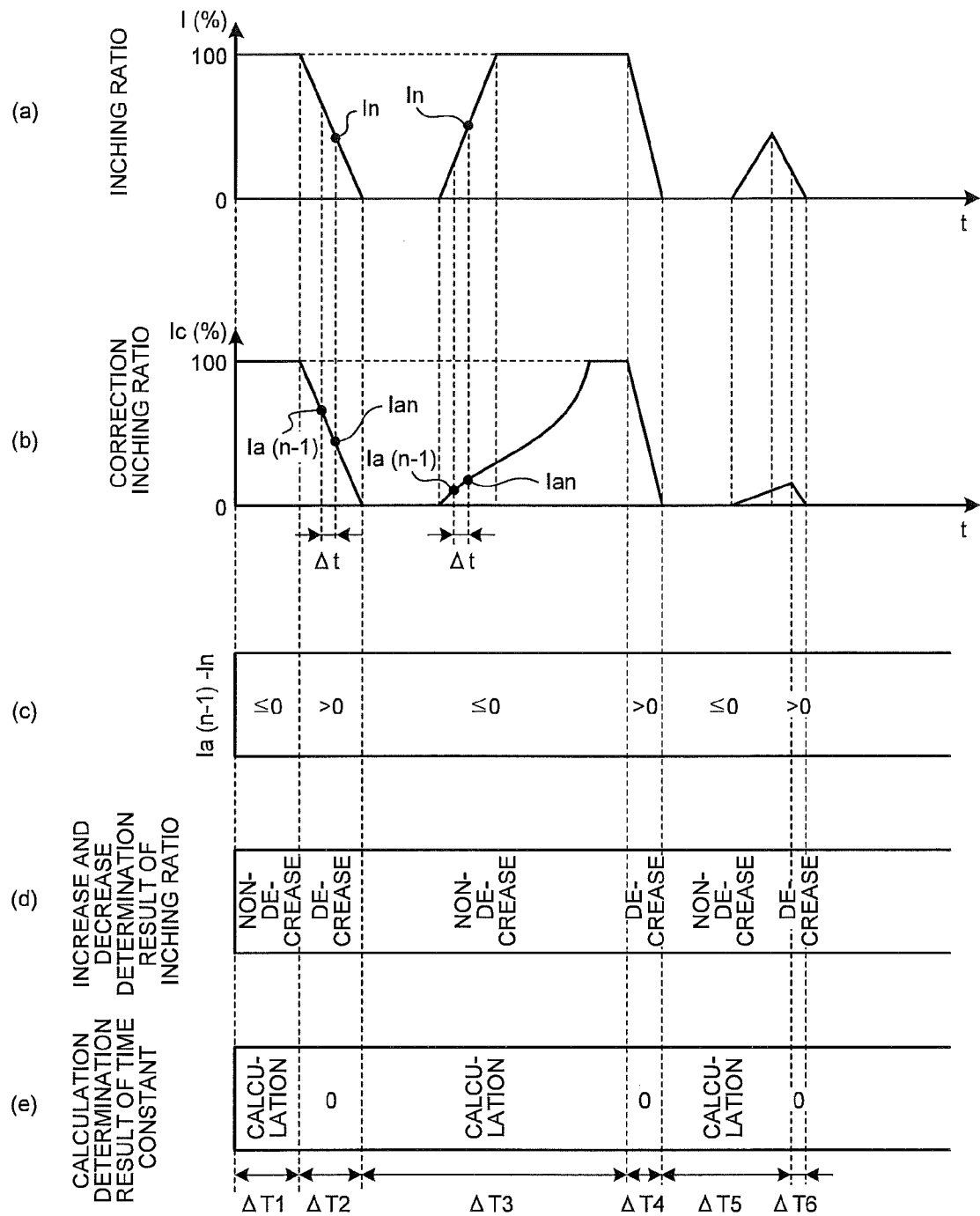
FIG. 11 is a time chart illustrating a correlation in time between an inching ratio and a correction inching ratio when performing the modulation process illustrated in FIG. 10.

FIG. 10 is a flowchart illustrating a process procedure when performing the modulation process by the modulation control unit 35 only when the inching ratio I does not decrease. Further, FIG. 11 is a time chart illustrating a correlation in time among the inching ratio I, the correction inching ratio Ic, and the inching process contents when performing the modulation process only when the inching ratio I does not decrease. Furthermore, FIG. 11(a) illustrates a change in time of the inching ratio I. FIG. 11(b) illustrates a change in time of the correction inching ratio Ic. FIG. 11(c) illustrates a change in time of a value obtained by subtracting an inching ratio In of a current input from a correction inching ratio Ia (n−1) of a precedent output before a sampling period $\Delta$t. FIG. 11(d) illustrates a change in time of an increase and decrease determination result of the inching ratio I. FIG. 11(e) illustrates a calculation determination result of the time constant T.

As illustrated in FIG. 10, the modulation control unit 35 first acquires the correction inching ratio Ia (n−1) of the precedent output (step S101), and further acquires the inching ratio In of the current input (step S102).

Subsequently, it is determined whether the value obtained by subtracting the inching ratio In of the current input from the correction inching ratio Ia (n−1) of the precedent output is equal to or less than 0 (step S103). When the value is equal to or less than 0 (Yes in step S103), the inching ratio I is increased or maintained. Then, the time constant T based on the map M3 is calculated (step S104), and the current correction inching ratio Ian having the time constant T is output. On the other hand, when the value is more than 0 (No in step S103), the inching ratio I is decreased. In this case, the time constant T is set to 0 (step S105), and the inching ratio I of the current input is output as the correction inching ratio Ian without performing the modulation process (step S106).

Subsequently, the output correction inching ratio Ian is replaced by the correction inching ratio Ia (n−1) of the precedent output (step S107), and the routine proceeds to step S101 so as to repeat the above-described process.

For example, as illustrated in FIG. 11, the value obtained by subtracting the inching ratio In of the current input from the correction inching ratio Ia (n−1) of the precedent output becomes equal to or less than 0 at the period $\Delta$T1, the period $\Delta$T3, and the period $\Delta$T5 (FIG. 11(c)), an increase and decrease determination is made such that the inching ratio I does not decrease (is in a non-decrease state) (FIG. 11(d)), and the modulation process of the inching ratio I is performed by calculating the time constant T (FIG. 11(e)). On the other hand, the value obtained by subtracting the inching ratio In of the current input from the correction inching ratio Ia (n−1) of the subsequent output becomes more than 0 at the period $\Delta$T2, the period $\Delta$T4, and the period $\Delta$T6 (FIG. 11(c)), an increase and decrease determination is made such that the inching ratio I decreases (FIG. 11(d)), and the modulation process of the inching ratio I is not performed by setting the time constant T to 0 without calculating the time constant T (FIG. 11(e)).

Furthermore, when switching from the running state to the stop state through a strong deceleration, the HST motor 20 rotates the HST pump 10 by the inertia of the vehicle body, and hence the engine 4 connected to the HST pump 10 also rotates. Accordingly, the rotation of the engine 4 increases even when the accelerator operation amount As is set to 0%. For this reason, when the inching operation amount Is increases by pulling the inching pedal 40a in a state where the engine speed does not decrease after the vehicle stops, there is a case in which the forklift 1 may be started. Even in such a case, in the inching control according to the embodiment, the inching ratio I decreases by performing a large modulation process when the speed difference $\Delta$N is large, and hence it is possible to suppress the forklift 1 from being started.

In the above-described embodiment, when the speed difference $\Delta$N obtained by subtracting the actual engine speed Nr from the target engine speed Na is large, even when the actual engine speed Nr is large, the inching ratio I decreases by performing a large modulation process, and hence the absorption torque of the HST motor 20 is suppressed. Accordingly, it is possible to perform a work and a running operation according to the operator's intended operation.

Further, in the above-described embodiment, for example, in a case where the vehicle is immediately started after the cargo handling operation, a small modulation process is performed since the speed difference $\Delta$N is small. Accordingly, a large acceleration can be obtained, and hence it is possible to immediately switch the state of the forklift 1 to the running state.

In addition, in the above-described embodiment, for example, in a case where the pushing or drawing operation of the fork 6 is performed after the cargo handling operation, a modulation process is not substantially performed since the speed difference $\Delta$N is almost 0. Then, the correction inching ratio Ic becomes equal to the inching ratio I as in the related art, and hence a large acceleration can be obtained. Accordingly, it is possible to easily perform the above-described pushing or drawing operation.

REFERENCE SIGNS LIST 1 forklift
2a driving wheel
2b steering wheel
3 vehicle body 4 engine
5 working machine
6 fork
7 lifting cylinder
8 tilting cylinder
10 HST pump
10a, 10b hydraulic pressure supply pipe
11 pump capacity setting unit
12 forward moving pump electromagnetic proportional control valve
13 backward moving pump electromagnetic proportional control valve
14 pump capacity control cylinder
15 charge pump
16 working machine hydraulic pump
20 HST motor
20a output shaft
20b transfer
21 motor capacity setting unit
22 motor electromagnetic proportional control valve
23 motor cylinder control valve
24 motor capacity control cylinder
30 controller
31 target absorption torque calculating unit
32 inching ratio calculating unit
33 fuel injection amount calculating unit
34 target engine speed calculating unit
35 modulation control unit
36 multiplication unit
37 HST pump electromagnetic proportional control output current converting unit
40 inching potentiometer
40a inching pedal
41 accelerator potentiometer
41a accelerator pedal
42 forward and backward lever switch
42a forward and backward lever
43 engine rotation sensor
44, 45 pressure detecting sensor
100 main hydraulic circuit
Nr actual engine speed
Na target engine speed
ΔN speed difference
Is inching operation amount
As accelerator operation amount
I inching ratio
Ic correction inching ratio
Tm target absorption torque
Tc correction absorption torque

The invention claimed is:

1. A forklift comprising:
a variable displacement hydraulic pump which is driven by an engine;
a hydraulic motor for forming a closed circuit between the hydraulic pump and the hydraulic motor, the hydraulic motor being driven by pressure oil discharged from the hydraulic pump;
driving wheels which are driven by the hydraulic motor;
a working machine which is hydraulically driven by a variable displacement working machine hydraulic pump driven by the engine;
an accelerator operating unit for increasing or decreasing a fuel injection amount to the engine;
an inching operating unit for operating an inching ratio as a decrease ratio of a target absorption torque of the hydraulic pump by the stepping of an inching pedal;
an actual engine speed detecting unit for detecting an actual engine speed of the engine;
a target engine speed calculating unit for calculating a target engine speed corresponding to the operation amount of the accelerator operating unit;
an inching ratio calculating unit for calculating the inching ratio corresponding to the operation amount of the inching operating unit;
a modulation control unit for setting an output time constant of the inching ratio in response to a speed difference between the target engine speed and the actual engine speed so as to perform a modulation control outputting a correction inching ratio having the output time constant set thereto; and
an output control unit for outputting an instruction of an absorption torque which decrease the target absorption torque at the correction inching ratio output from the modulation control unit to the hydraulic pump.

2. The forklift according to claim 1, wherein the modulation control unit increases the output time constant of the inching ratio as the value of the speed difference obtained by subtracting the actual engine speed from the target engine speed increases.

3. The forklift according to claim 1, wherein the modulation control unit performs the modulation control when the inching ratio decreases.

4. An inching control method of a forklift including:
a variable displacement hydraulic pump which is driven by an engine;
a hydraulic motor for forming a closed circuit between the hydraulic pump and the hydraulic motor, the hydraulic motor being driven by pressure oil discharged from the hydraulic pump;
driving wheels which are driven by the hydraulic motor,
a working machine which is hydraulically driven by a variable displacement working machine hydraulic pump driven by the engine;
an accelerator operating unit for increasing or decreasing a fuel injection amount to the engine; and
an inching operating unit for operating an inching ratio as a decrease ratio of a target absorption torque of the hydraulic pump by the stepping of an inching pedal,
the inching control method comprising:
an inching ratio calculating of calculating the inching ratio corresponding to the operation amount of the inching operating unit; and
a modulation controlling of setting an output time constant of the inching ratio in response to a speed difference between a target engine speed corresponding to the operation amount of the accelerator operating unit and an actual engine speed of the engine so as to perform a modulation control outputting a correction inching ratio having the output time constant set thereto.

5. The inching control method of the forklift according to claim 4, wherein the modulation controlling increases the output time constant of the inching ratio as the value of the speed difference obtained by subtracting the actual engine speed from the target engine speed increases.

6. The inching control method of the forklift according to claim 4, wherein the modulation controlling performs the modulation control when the inching ratio decreases.

* * * * *